(12) United States Patent
Takemura et al.

(10) Patent No.: US 6,268,691 B1
(45) Date of Patent: Jul. 31, 2001

(54) RED EMITTING PHOSPHOR FOR CATHODE RAY TUBE

(75) Inventors: Hirofumi Takemura, Kamakura; Satoshi Sugano, Yokohama; Hiroyasu Yashima; Yohe Shimizu, both of Shizuoka-ken; Tsuyoshi Oyaizu, Fukaya; Akira Mikami, Kumagaya, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/379,113

(22) Filed: Aug. 23, 1999

(30) Foreign Application Priority Data

Aug. 26, 1998 (JP) .................................................. 10-240729

(51) Int. Cl.⁷ ...................................................... H01J 29/10
(52) U.S. Cl. ............................................ 313/467; 313/486
(58) Field of Search ................................... 313/463, 467, 313/486, 487; 428/403; 252/301.68

(56) References Cited

U.S. PATENT DOCUMENTS

| | | | |
|---|---|---|---|
| 4,287,257 | 9/1981 | Ohmatoi et al. | 428/403 |
| 4,544,605 | 10/1985 | Miyazaki et al. | 428/404 |
| 5,277,840 | * 1/1994 | Osaka et al. | 313/467 |

FOREIGN PATENT DOCUMENTS

| | | |
|---|---|---|
| 59-8310 | 2/1984 | (JP) . |
| 60-21675 | 5/1985 | (JP) . |
| 61-46512 | 10/1986 | (JP) . |
| 54-102299 | 8/1987 | (JP) . |
| 62-39186 | 8/1987 | (JP) . |
| 2-178387 | 7/1990 | (JP) . |
| 3-220286 | 9/1991 | (JP) . |
| 8-41453 | 2/1996 | (JP) . |

* cited by examiner

Primary Examiner—Vip Patel
(74) Attorney, Agent, or Firm—Foley & Lardner (57) ABSTRACT

A red emitting phosphor comprises a yttrium oxysulfide phosphor as a base material. A red emitting phosphor of medium particle size type has such a particle size distribution that a content of a component of a particle diameter of less than 4.0 μm is 15% or less, that of a component of a particle diameter of 4.0 μm or more and less than 8.0 μm is 75% or more, and that of a component of a particle diameter of 8.0 μm or more is 10% or less. A red emitting phosphor of larger particle size type has such a particle size distribution that the content of a component of a particle diameter of less than 5.04 μm is 20% or less, that of a component of a particle diameter of 5.04 μm or more and less than 10.079 μm is 70% or more, and that of a component of a particle diameter of 10.079 μm or more is 10% or less. Phosphor layers employing these red emitting phosphors are excellent in denseness. Accordingly, a cathode ray tube of high contrast and high quality can be provided.

20 Claims, 3 Drawing Sheets

RED EMITTING PHOSPHOR FOR CATHODE RAY TUBE

BACKGROUND OF THE INVENTION

1. Field of the Invention

The present invention relates to red emitting phosphor for cathode ray tubes such as color Braun tubes and cathode ray tubes using the same.

2. Description of the Related Art

A phosphor layer of a color cathode ray tube is generally fabricated in the following way. That is, first, into water solution that contains polyvinyl alcohol (PVA), ammonium dichromate and a surfactant, phosphor is dispersed to prepare a phosphor slurry. This phosphor slurry is coated on a glass panel to form a phosphor layer. Then, onto this phosphor layer, ultra-violet rays are irradiated through a shadow mask to cure the PVA of irradiated portion. By developing, the phosphor layer other than the cured portion is removed. In this way, the phosphor layer is formed in stripe or in dot.

Upon forming a phosphor layer by the use of the aforementioned coating method, the following characteristics are demanded for the phosphor. That is, the phosphor (1) is capable of forming a phosphor layer of closely disposed stripe or dot, (2) does not mingle with another phosphor of different color, (3) sticks strongly to a panel, and (4) can form a phosphor layer of sufficient thickness. Further, in the case of pigmented phosphor being employed, the pigment is required not to peel off the phosphor in the slurry solution.

So far, in order to satisfy the aforementioned requirement on phosphor, a variety of kinds of surface treatments of phosphor have been implemented to improve and develop. For instance, Japanese Patent Laid Open Publication No. (KOKAI) Sho 54-102299 and Japanese Patent Publication (KOKOKU) No. Sho 59-8310 disclose methods in which by letting contact the pigmented phosphor with a solution of water soluble organic compound, dispersion ability of the phosphor is improved.

In addition, Japanese Patent Publication (KOKOKU) Nos. Sho 60-21675, Sho 61-46512 and Sho 62-39186 disclose method that improves dispersion property of phosphor by sticking an inorganic compound on the surface of phosphor. Further, Japanese Patent Laid-Open Publication (KOKAI) No. Hei 2-178387 discloses a method in which by sticking an inorganic compound and an organic compound on the surface of phosphor, settling property of phosphor in a slurry solution is improved.

As described above, so far, by the use of the surface treatment in which an inorganic compound or an organic compound is stuck on the phosphor, quality of the phosphor layer has been improved to some degree. However, accompanying the recent enlargement of the computer market, color cathode ray tubes are demanded to satisfy higher performance that the computer display terminal demands. Accordingly, the phosphor layer thereof is also demanded to satisfy requirement of higher performance. In particular, demand for higher contrast is strong. In addition, also in cathode ray tubes for color television, upon making the screen larger and finer, the phosphor layer of higher quality, particularly of higher contrast, is being demanded.

As a method for attaining the higher contrast, an improvement of the brightness of phosphor layer can be cited. In order to improve the brightness of the phosphor layer, the phosphor itself is required to improve the brightness thereof, or by forming a denser phosphor layer than ever, the phosphor layer can improve the brightness thereof.

Now, the present inventors have paid attention to a method that materialize densification of the phosphor layer to improve the brightness thereof and accordingly the contrast of color cathode ray tubes. With the above intention, the inventors have studied in detail the quality of the phosphor layer of the existing color cathode ray tube. As a result of this, it is found that denseness of the red emitting phosphor layer is remarkably poor in contrast with those of green and blue emitting phosphor layers. The low denseness of the red emitting phosphor layer does have no relation with the order by which each phosphor of three colors is coated.

Thus, through improvement of the denseness of the red emitting phosphor layer, the brightness of the red emitting phosphor layer can be improved, as a result of this higher contrast of a color cathode ray tube can be realized. However, the existing red emitting phosphor can not form such dense red emitting phosphor layer.

Further, Japanese Patent Laid-Open Publication (KOKAI) No. Hei 3-220286 discloses a red emitting phosphor (phosphor that has yttrium oxysulfide as a phosphor base material) of which content of particles of particle diameter coarser than 8.01 $\mu$m is 10% or less. However, only by reducing the ratio of the coarser particles, the denseness of the red emitting phosphor layer can not be sufficiently heightened.

Further, in Japanese Patent Laid-Open Publication (KOKAI) No. Hei 8-41453, a fabrication method is disclosed in which rare earth oxide raw material is mixed with alkali metal carbonate, aluminum compound and sulfur raw material, and the mixture thereof is fired to fabricate a rare earth oxysulfide phosphor. In the embodiment of this publication, as criteria of particle size distribution, $-\log (d_{84}/d_{50})$ and $+\log (d_{16}/d_{50})$ are disclosed. However, the red emitting phosphor having the disclosed particle distribution can not sufficiently improve the denseness of the phosphor layer.

SUMMARY OF THE INVENTION

Accordingly, an object of the present invention is to provide a red emitting phosphor for cathode ray tubes that enables to obtain a phosphor layer of very high denseness with reproducibility. Another object of the present invention is to provide, by employing such a red emitting phosphor, a cathode ray tube in which the brightness of the phosphor layer is improved and accordingly the higher contrast is realized.

A first red emitting phosphor for cathode ray tube of the present invention is a red emitting phosphor for cathode ray tube that comprises phosphor powder of which base material is yttrium oxysulfide, wherein the phosphor powder has such a particle size distribution that the content of a component of a particle diameter of less than 4.0 $\mu$m is 15% or less, that of a component of a particle diameter of 4.0 $\mu$m or more and less than 8.0 $\mu$m is 75% or more, and that of a component of a particle diameter of 8.0 $\mu$m or more is 10% or less.

The first red emitting phosphor for cathode ray tube stipulates that the particle size distribution of the red emitting phosphor of medium particle size has a 50% D value of cumulative particle size distribution of for instance 5.0 μm or more and 6.5 μm or less. Such a red emitting phosphor of medium particle size is suitable for cathode ray tubes for computer display use.

A second red emitting phosphor for cathode ray tube of the present invention is a red emitting phosphor for cathode ray tube that comprises phosphor powder of which phosphor base material is yttrium oxysulfide, wherein the phosphor powder has a particle size distribution in which the content of a component of a particle diameter of less than 5.04 μm is 20% or less, that of a component of a particle diameter of 5.04 μm or more and less than 10.079 μm is 70% or more, and that of a component of a particle diameter of 10.079 μm or more is 10% or less.

The second red emitting phosphor for cathode ray tube stipulates that the particle size distribution of red emitting phosphor of large particle size has the 50% D value of cumulative particle size distribution of for instance 6.5 μm or more and 8.0 μm or less. Such a red emitting phosphor of larger particle size is suitable for cathode ray tubes for color television use.

A first cathode ray tube of the present invention comprises a panel that constitutes an envelope, a phosphor layer that is formed on an internal surface of the panel and contains the first red emitting phosphor for cathode ray tube of the present invention, and an electron source that emits electron beams onto the phosphor layer. The first cathode ray tubes are suitable for computer display use.

A second cathode ray tube of the present invention comprises a panel that constitutes an envelope, a phosphor layer that is formed on an internal surface of the panel and contains the second red emitting phosphor for cathode ray tube of the present invention, and an electron source that emits electron beams onto the phosphor layer. The second cathode ray tubes are suitable for color television use.

In the present invention, the particle size distribution of the red emitting phosphor for cathode ray tube of which base material is yttrium oxysulfide is optimized. That is, as a result of study of relationship between the particle size distribution of the phosphor and the denseness of the phosphor layer, it was found that by making sharp the particle size distribution of the red emitting phosphor the denseness of the phosphor layer can be remarkably improved. Based on such findings, by the use of the red emitting phosphor of the present invention of which particle size distribution is optimized, the denseness of the phosphor layer can be largely improved.

As described above, the phosphor layer involving the existing red emitting phosphor was remarkably poor in the denseness thereof compared with those of green emitting phosphor layer and blue emitting phosphor layer. The denseness of such red emitting phosphor layer can be largely improved by optimizing the particle size distribution. In addition, a cathode ray tube having a dense phosphor layer can improve the brightness thereof. Accordingly, a cathode ray tube of high contrast and high quality can be materialized.

DESCRIPTION OF THE PREFERRED EMBODIMENTS

In the following embodiments for practicing the present invention will be described.

A red emitting phosphor for cathode ray tube of the present invention has yttrium oxysulfide as a phosphor base material. As the representative thereof, europium activated yttrium oxysulfide ($Y_2O_2S$: Eu) phosphor can be cited. Into the yttrium oxysulfide phosphor, other than europium (Eu) rare earth elements such as Tb, Pr, Er, Sm or the like can be introduced as co-activator, further also W, Sb or the like can be introduced therein.

Eu is preferably contained in the range of from 3 to 8% by weight as an activator in the phosphor base material. When the content of Eu is less than 3% by weight, emission color shifts to orange side. Accordingly, characteristic as a red emitting component deteriorates. In contrast, when the content of Eu exceeds 8% by weight, the brightness is likely to become low. When a co-activator such other rare earth elements as Tb, Pr, Er, Sm or the like, and W, Sb or the like is employed, the content thereof is preferable to be in the range of 0 to 1% by weight.

Further, the red emitting phosphor of the present invention is not restricted to the aforementioned europium activated yttrium oxysulfide phosphor. A variety of kinds of phosphors based on the yttrium oxysulfide base material can be employed.

In a first red emitting phosphor for cathode ray tube of the present invention, the particle size distribution of the aforementioned red emitting phosphor of which phosphor base material is yttrium oxysulfide is constituted so that the content of a component of a particle diameter of less than 4.0 μm is 15% by weight or less, that of 4.0 μm or more and less than 8.0 μm is 75% by weight or more, and that of 8.0 μm or more is 10% by weight or less. Incidentally, the particle size distribution in the present invention was measured by the use of Coulter counter method.

The first red emitting phosphor for cathode ray tube is a medium size red emitting phosphor that has a 50% D value of for instance 5.0 μm or more and 6.5 μm or less. Here the 50% D value is a particle diameter where a cumulative particle size distribution reaches 50%. The medium size red emitting phosphor, when the 50% D value of the cumulative particle size distribution is less than 5.0 μm, has a tendency of lower brightness and though depending on usage thereof, deteriorates quality of products. The medium size red emitting phosphor is employed in cathode ray tubes for computer display use.

In the medium size red emitting phosphor, relatively coarse particles of a particle diameter of 8.0 μm or more cause lowering of in particular the denseness of phosphor layer. Accordingly, the content thereof in phosphor powder is set at 10% by weight or less. The content of the component of a particle diameter of 8.0 μm or more is particularly preferable to be 8% by weight or less. In contrast, relatively fine particles of a particle diameter of less than 4.0 μm cause deterioration of emission efficiency and as identical as the case of the coarser particles the denseness of the phosphor layer. Accordingly, the content thereof in phosphor powder is set at 15% or less. The content of the component of a particle diameter of less than 4.0 μm is further preferable to be 10% by weight or less.

In other words, so that the content of the component of a particle diameter of 4.0 μm or more and less than 8.0 μm that is suitable for formation of a denser phosphor layer and more excellent in emission efficiency is 75% or more, the particle size distribution of the medium size red emitting phosphor is made sharp. Thereby, the denseness of the phosphor layer using the aforementioned phosphor can be remarkably improved. The content of the component of a particle diameter of 4.0 μm or more and less than 8.0 μm is further preferable to be 82% by weight or more contained.

In a second red emitting phosphor for cathode ray tube of the present invention, the particle size distribution of the aforementioned red emitting phosphor of which phosphor base material is yttrium oxysulfide is constituted such that the content of a component of a particle diameter of less than 5.04 μm to be 20% by weight or less, that of 5.04 μm or more and less than 10.079 μm to be 70% by weight or more, and that of 10.079 μm or more to be 10% by weight or less.

The second red emitting phosphor for cathode ray tube is a larger size red emitting phosphor that has the 50% D value of for instance 6.5 μm or more and 8.0 μm or less. The larger size red emitting phosphor, when the 50% D value of the cumulative particle size distribution exceeds 8.0 μm, shows a tendency of poor film quality. The larger size red emitting phosphor is employed in cathode ray tubes for, for instance color television.

In the larger size red emitting phosphor, relatively coarse particles of a particle diameter of 10.079 μm or more cause in particular lowering of the denseness of the phosphor layer. Accordingly, the content thereof in phosphor powder is set at 10% by weight or less. The content of the component of a particle diameter of 10.079 μm or more is particularly preferable to be 8% by weight or less. In contrast, relatively fine particles of a particle diameter of less than 5.04 μm cause deterioration of emission efficiency and the denseness of the phosphor layer as identical as the case of the coarse particles. Accordingly, the content thereof in phosphor powder is set at 20% or less. The content of the component of a particle diameter of less than 5.04 μm is further preferable to be 15% by weight or less.

In other words, so that the content of the component of a particle diameter of 5.04 μm or more and less than 10.079 μm that is suitable for formation of a denser phosphor layer and more excellent in emission efficiency is 70% or more, the particle size distribution of the larger size red emitting phosphor is made sharp. Thereby, the denseness of the phosphor layer using the aforementioned phosphor can be remarkably improved. The content of the component of a particle diameter of 5.04 μm or more and less than 10.079 μm is further preferable to be 75% by weight or more.

Incidentally, in the conventional red emitting phosphor for cathode ray tube, only the component of a particle diameter of 2 μm or less of very low emission efficiency and the component of a particle diameter of 20 μm or more that tends to cause coagulation defect when the phosphor layer is formed are removed as much as possible. There is no control of the particle size distribution as the present invention does.

As a result of the study of relationship between the particle size distribution of phosphor and the denseness of phosphor layer, the present inventors have found that when the particle size distribution of the red emitting phosphor is regulated to be sharp the denseness of the phosphor layer could be improved. Based on the finding, the present invention adopts the aforementioned particle size distribution. In the present invention, for each of the medium size red emitting phosphor and the lager size red emitting phosphor, particle size distribution is stipulated, respectively. By employing a red emitting phosphor for cathode ray tube that has such a particle size distribution, the denseness of the phosphor layer due to the red emitting phosphor can be largely improved.

The red emitting phosphor for cathode ray tube of the present invention can be prepared by for instance the following way.

That is, first into pure water red emitting phosphor such as europium activated yttrium oxysulfide phosphor is poured to be followed by stirring. Then, stirring of the phosphor slurry is ceased to let settle the phosphor for a certain time period. Thereafter, upper portion slurry down to a prescribed height is removed by the use of siphon. With such a means the finer particle component thereof can be removed. As the demand arises, water glass or the like can be added in advance. Further, by repeating the same operation, this time the bottom portion slurry up to a prescribed height is removed. Thereby, the coarser particle component can be removed.

Thus, by removing the finer particle component and the coarser particle component, the red emitting phosphors for cathode ray tube of the present invention can be prepared. The red emitting phosphors have such very sharp particle size distributions as that for the medium size type the component of a particle diameter of 4.0 μm or more and less than 8.0 μm is 75% or more and for the larger size type the component of a particle diameter of 5.04 μm or more and less than 10.079 μm is 70% or more can be prepared. The particle size distributions according to the respective types can be obtained by controlling the slurry height when the finer particle component and the coarser particle component are removed, respectively.

In addition, also by fractionating commercial red emitting phosphor for cathode ray tube by the use of a cyclone separator or a sieve, the red emitting phosphor for cathode ray tube of the present invention can be prepared similarly. Further, in the course of processing of red emitting phosphor, it is important to select appropriately flux, firing crucible, firing condition or the like. Thereby, the red emitting phosphor having the particle size distribution meeting the object can be prepared.

Figure 1:
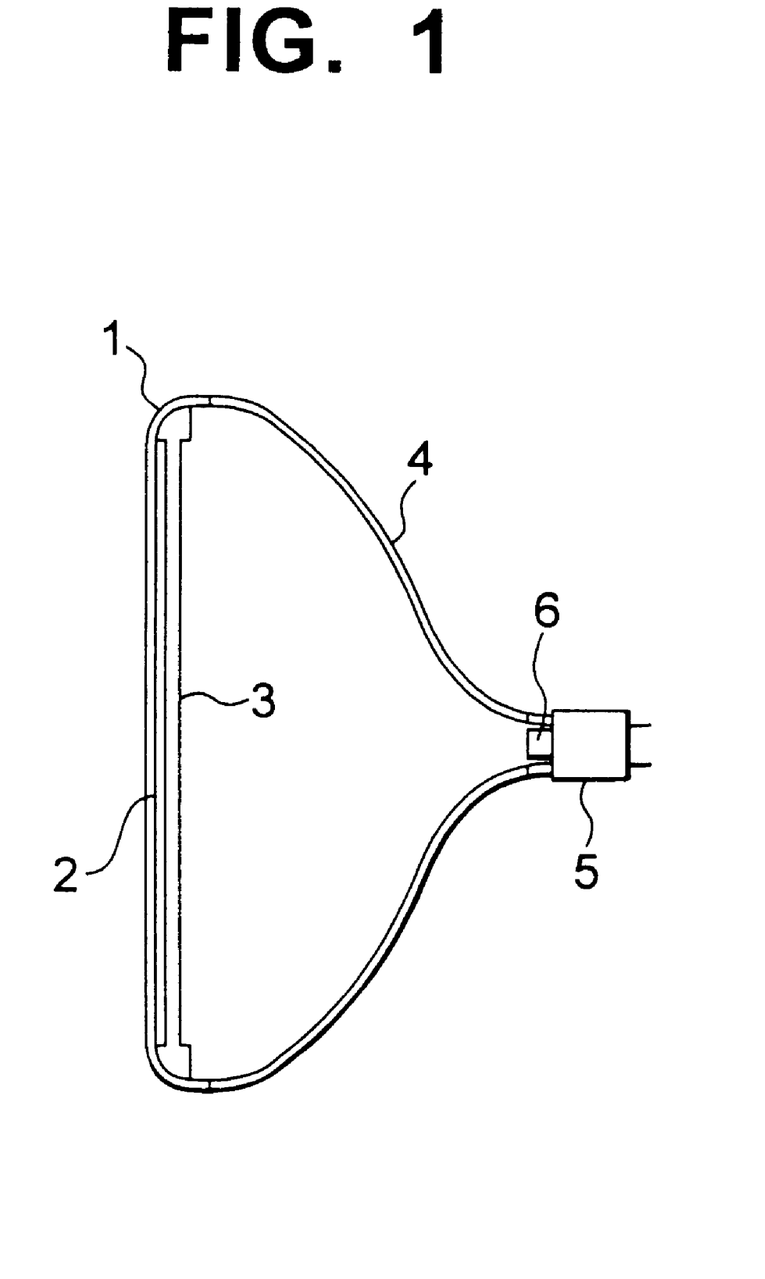
FIG. 1 is a cross section showing a schematic structure of a color cathode ray tube due to one embodiment of the present invention.

A cathode ray tube of the present invention comprises a phosphor layer that contains the aforementioned red emitting phosphor for cathode ray tube of the present invention. FIG. 1 shows a cross section of an essential constitution of a color cathode ray tube due to one embodiment of the present invention.

In the same figure, reference numeral 1 denotes a panel portion in which on an internal surface thereof a phosphor layer 2 is formed. The phosphor layer 2 is formed in dot or in stripe. The phosphor layer formed in dot is effective for Braun tubes for computed display (CDT). The phosphor layer formed in stripe is effective for Braun tubes for color television (CPT).

On an internal side of the panel portion 1, with a prescribed distance apart from the phosphor layer 2 that is formed on the inner surface thereof, a shadow mask 3 is disposed facing thereto. The shadow mask 3 is provided with a lot of fine holes or slits that are omitted in the figure. The panel portion 1 is connected to a neck portion 5 through a funnel portion 4. An electron gun is disposed in the neck portion 5. An electron beam emitted from the electron gun 6 is bombarded to the phosphor layer 2 through the fine holes or slits of the shadow mask 3.

In the color cathode ray tube shown in FIG. 1, for the red emitting phosphor of the phosphor layer 2 that emits due to electron bombardment from the electron gun 6, a first or second red emitting phosphor for cathode ray tube of the present invention is employed. Here, upon constituting a color cathode ray tube, putting aside the red emitting phosphor, for green emitting phosphor or blue emitting phosphor, existing known phosphors can be used. For instance, ZnS: Cu, Al or ZnS: Cu, Au, Al or the like can be used for the green emitting phosphor. And for the blue emitting phosphor, ZnS: Ag, Al or ZnS: Ag, Cl or the like can be used.

A cathode ray tube of the present invention comprises a phosphor layer that contains a red emitting phosphor (medium size or larger size type) of which particle size distribution is regulated to be sharp. Now, in the existing cathode ray tube, compared with phosphor layers due to green emitting and blue emitting phosphors, the denseness of the phosphor layer due to the red emitting phosphor was extremely poor. In relation with such a problem, the present invention optimized the particle size distribution and thereby the denseness of the layer due to red emitting phosphor is remarkably improved. Accordingly, very dense phosphor layer of dot or stripe shape can be obtained. As a result of this, the brightness of a color cathode ray tube that comprises such a phosphor layer can be improved and further a color cathode ray tube of high contrast and high quality can be provided.

In the following, concrete embodiments and evaluation data thereof will be described.

Embodiment 1

First, 1 kg of europium activated yttrium oxysulfide phosphor is dispersed in pure water of 8 L (litter). To this dispersion liquid, 3.3 cc of water glass (25% of Si is included) is added, followed by 30 min stirring. Upon standing for 60 min after stirring, from the upper portion of the phosphor slurry 6 L of slurry is removed by the use of siphon.

Further 6 L of pure water was added, followed by 30 min stirring. Thereafter it was stood for 15 min and 6 L of slurry was taken out of the bottom portion thereof by the use of siphon. The phosphor slurry that underwent such a treatment was washed by pure water and filtered and dried. After drying sufficiently, by sieving by the use of a sieve of 400 mesh, a first red emitting phosphor (medium size type) of the present invention is obtained.

The particle size distribution of thus obtained red emitting phosphor was measured by the use of Coulter counter method. The result is shown in Table 1. The 50% D value of the cumulative particle size distribution of this red emitting phosphor was 5.8 $\mu$m.

Incidentally, the comparative example 1 in Table 1 shows an existing red emitting phosphor to which only a process for removing a component of a particle diameter of 2 $\mu$m or less that is very low in emission efficiency and a component of a particle diameter of 15 $\mu$m or more that tends to cause coagulation defect is applied. The comparative example 2 is an existing red emitting phosphor (corresponding to the products due to Japanese Patent Laid Open Publication (KOKAI) No. Hei 8-41453) thereto only a process for removing a component of a particle diameter of 10 $\mu$m or more is applied.

TABLE 1

| Range of Particle Diameter ($\mu$m) | Ratio (%) | | | | | |
|---|---|---|---|---|---|---|
| | Embodiment 1 | | Comparative Example 1 | | Comparative Example 2 | |
| 1.587–2.000 | 0.0 | 7.6 | 0.0 | 12.0 | 0.0 | 16.5 |
| 2.000–2.520 | 0.0 | | 0.0 | | 0.0 | |
| 2.520–3.175 | 1.1 | | 3.3 | | 5.1 | |
| 3.175–4.000 | 6.5 | | 8.7 | | 11.4 | |
| 4.000–5.040 | 22.4 | 87.9 | 16.2 | 66.9 | 18.9 | 74.2 |
| 5.040–6.350 | 36.8 | | 24.5 | | 30.1 | |
| 6.350–8.000 | 28.7 | | 26.2 | | 25.2 | |
| 8.000–10.079 | 4.1 | 4.5 | 15.4 | 21.1 | 6.6 | 9.3 |
| 10.079–12.699 | 0.2 | | 4.8 | | 2.2 | |
| 12.699–16.000 | 0.1 | | 0.9 | | 0.4 | |
| 16.000–20.159 | 0.1 | | 0.0 | | 0.1 | |
| 20.159–25.398 | 0.0 | | 0.0 | | 0.0 | |
| 25.398–32.000 | 0.0 | | 0.0 | | 0.0 | |
| 32.000–40.317 | 0.0 | | 0.0 | | 0.0 | |
| 40.317–50.797 | 0.0 | | 0.0 | | 0.0 | |
| over 50.797 | 0.0 | | 0.0 | | 0.0 | |
| 50% D Value ($\mu$m) | 5.8 | | 6.3 | | 5.8 | |

Figure 2:
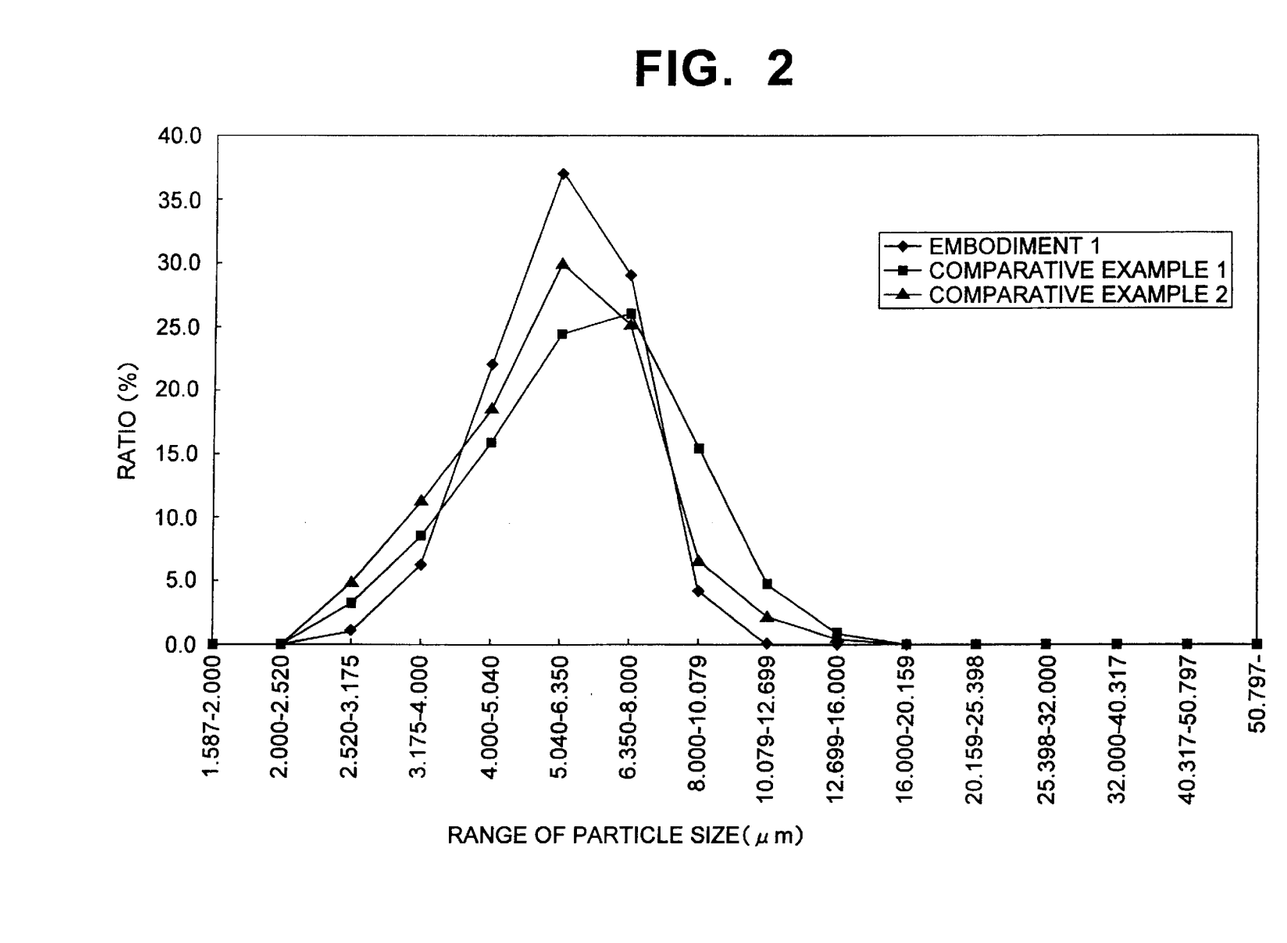
FIG. 2 is a diagram showing a particle size distribution of a red emitting phosphor (medium particle size) due to Embodiment 1 of the present invention comparing with those of conventional medium size red emitting phosphors (comparative examples 1 and 2)

Further, the particle size distributions of the respective red emitting phosphors of Embodiment 1, Comparative Examples 1 and 2 are shown in FIG. 2. As obvious from FIG. 2, the particle size distribution of the red emitting phosphor of Embodiment 1 is sharper than those of Comparative Examples 1 and 2, and the content of the component of a particle diameter of 4.0 $\mu$m or more and less than 8.0 $\mu$m that contributes largely to densification of the phosphor layer and improvement of emission efficiency is extremely high.

With the aforementioned respective red emitting phosphors of Embodiment 1, Comparative Examples 1 and 2, by the use of the ordinary method, phosphor slurries are prepared, respectively. By the ordinary method, these slurries are coated on panels of color Braun tube to form the respective phosphor layers. The state of the thus formed respective phosphor layers was observed with an optical microscope. As a result of this, the phosphor layer that employs the red emitting phosphor due to Embodiment 1 was found to be superior in denseness of the phosphor layer to those of red emitting phosphors due to Comparative Examples 1 and 2.

Figure 3:
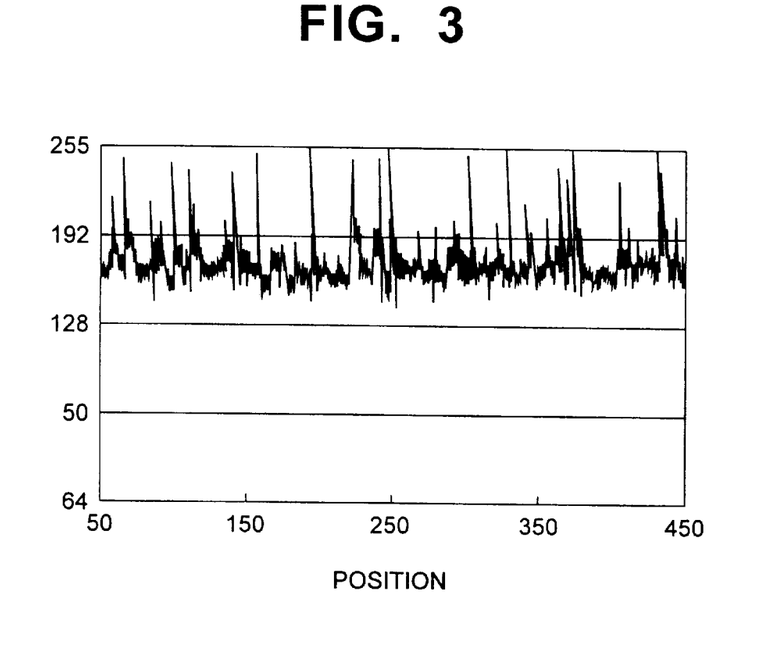
FIG. 3 is a diagram showing light transmittance of a phosphor layer that is fabricated by employing the red emitting phosphor (medium particle size) due to Embodiment 1 of the present invention.
Figure 4:
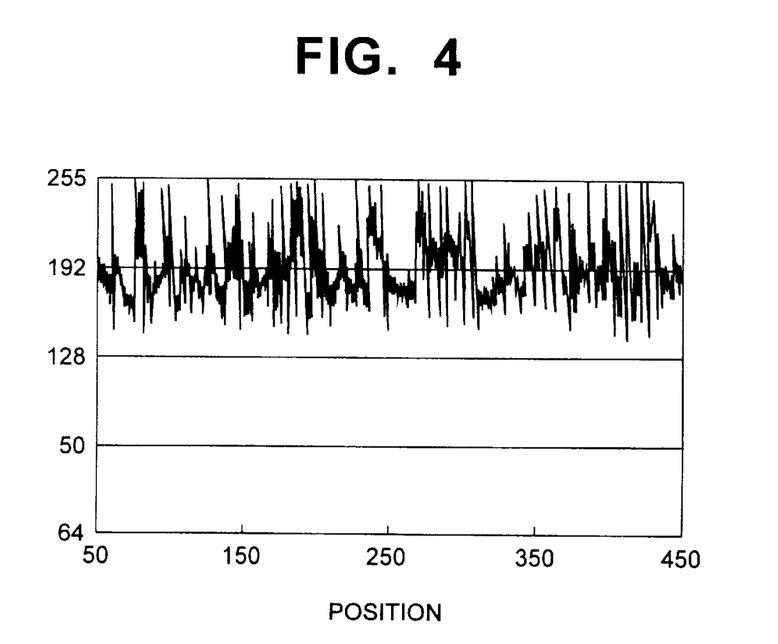
FIG. 4 is a diagram showing light transmittance of a phosphor layer that is fabricated by employing the conventional medium size red emitting phosphor (comparative example 1).

Light transmittances of the respective phosphor layers due to Embodiment 1 and Comparative Example 1 are shown in FIGS. 3 and 4. FIG. 3 shows the light transmittance of the phosphor layer due to Embodiment 1, and FIG. 4 shows the light transmittance of the phosphor layer due to Comparative Example 1. When the average transmittance of the phosphor layer due to Comparative Example 1 is assigned 100, the light transmittance of the phosphor layer due to Embodiment 1 is 90%. This indicates an improvement of 10% of the denseness. As to the improvement of the denseness, SEM observation of the phosphor layer also confirmed to be true. In particular, removal of the larger size component of 8 $\mu$m or more was effective.

In addition, upon measuring the brightness (red color only) of each phosphor layer, relative to the value of 100 of the phosphor layer of Comparative Example 1, that of the phosphor layer of Embodiment 1 was 110. That of the phosphor layer of Comparative Example 2 was 102. Further, due to improvement of the denseness of the layer of the red emitting phosphor, aluminum reflective film was formed smoother. As a result of this, green brightness and blue brightness each was improved by 5% and 2% to result in 7% improvement of white brightness. Thus, by the use of the medium size red emitting phosphor of the present invention the brightness of the phosphor layer can be improved. This largely contributes in improving the contrast and quality of the color cathode ray tube.

Embodiment 2

First, 1 kg of europium activated yttrium oxysulfide phosphor was dispersed in 8 L of pure water. To this dispersion liquid, 3.3 cc of water glass (including 25% of Si) was added, followed by 30 min stirring. After stirring, it was stood for 120 min, and from the upper portion thereof 6 L of the slurry was removed by the use of siphon.

Further 6 L of pure water is added, followed by 30 min stirring. Thereafter it was stood for 15 min and 6 L of slurry was taken out of the bottom portion thereof by the use of siphon. The phosphor slurry that underwent such a treatment was washed by pure water and filtered and dried. After drying sufficiently, by sieving by the use of a sieve of 400 mesh, a first red emitting phosphor (medium size type) of the present invention was obtained.

The particle size distribution of thus obtained red emitting phosphor was measured by the use of Coulter counter method. The result is shown in Table 2. The 50% D value of the cumulative particle size distribution of this red emitting phosphor was 5.6 $\mu$m.

TABLE 2

| Range of Particle Diameter ($\mu$m) | Ratio (%) Embodiment 2 | |
|---|---|---|
| 1.587–2.000 | 0.0 | 14.0 |
| 2.000–2.520 | 0.0 | |
| 2.520–3.175 | 2.2 | |
| 3.175–4.000 | 11.8 | |
| 4.000–5.040 | 29.6 | 84.8 |
| 5.040–6.350 | 38.9 | |
| 6.350–8.000 | 16.3 | |
| 8.000–10.079 | 1.1 | 1.2 |
| 10.079–12.699 | 0.1 | |
| 12.699–16.000 | 0.0 | |
| 16.000–20.159 | 0.0 | |
| 20.159–25.398 | 0.0 | |
| 25.398–32.000 | 0.0 | |
| 32.000–40.317 | 0.0 | |
| 40.317–50.797 | 0.0 | |
| over 50.797 | 0.0 | |
| 50% D Value ($\mu$m) | 5.6 | |

With the aforementioned red emitting phosphor of Embodiment 2, a phosphor slurry was prepared following the conventional method. The phosphor slurry was coated on a panel of color Braun tube following the conventional method to form a phosphor layer. The light transmittance of the obtained phosphor layer was measured. When assigned the average light transmittance of the phosphor layer due to Comparative Example 1 to 100, that of the phosphor layer due to Embodiment 2 was 88. As identical as Embodiment 1, it was confirmed that the denseness thereof was improved.

Further, when the brightness of the phosphor layer due to Embodiment 2 was measured, the red brightness was higher by 8% compared with that of the phosphor layer due to Comparative Example 1. In addition, the white brightness was also confirmed to be higher by 7%.

Embodiments 3 through 6

With the identical method as Embodiments 1 and 2, red emitting phosphors having various kinds of particle size distribution were prepared. In Table 3, the particle size distribution of the respective red emitting phosphors due to Embodiments 3 through 6 and the brightness of the respective phosphor layers using the same are shown. All the phosphor layers showed 5 to 10% improvement in brightness compared with that of the phosphor layer due to Comparative Example 1.

TABLE 3

| | Particle Size Distribution | | | | Brightness | |
|---|---|---|---|---|---|---|
| | Range of Particle Diameter (%) | | | | | |
| | Less than 4.0 $\mu$m | 4.0 to 8.0 $\mu$m | 8.0 $\mu$m or more | 50% D Value ($\mu$m) | Single Color (%) | NWIb (%) |
| Embodiment 3 | 5.0 | 90.5 | 4.5 | 5.9 | 108 | 106 |
| Embodiment 4 | 7.5 | 88.9 | 3.6 | 5.8 | 110 | 108 |
| Embodiment 5 | 8.8 | 85.2 | 6.0 | 6.0 | 107 | 105 |
| Embodiment 6 | 11.5 | 86.4 | 2.1 | 5.7 | 109 | 107 |
| Comparative Example 1 | 12.0 | 66.9 | 21.1 | 6.3 | 100 | 100 |

Embodiment 7

First, 1 kg of europium activated yttrium oxysulfide phosphor is dispersed in 8 L (litter) of pure water. To this dispersion liquid, 3.3 cc of water glass (including 25% of Si)

is added, followed by 30 min stirring. Upon standing for 90 min after stirring, from the upper portion of the phosphor slurry 6 L of slurry is removed by the use of siphon.

Further 6 L of pure water was added, followed by 30 min stirring. Thereafter it was stood for 10 min and 6 L of slurry was taken out of the bottom portion thereof by the use of siphon. The phosphor slurry that underwent such a treatment was washed by pure water and filtered and dried. After drying sufficiently, by sieving by the use of a sieve of 400 mesh, a second red emitting phosphor (larger size type) of the present invention was obtained.

The particle size distribution of thus obtained red emitting phosphor was measured by the use of Coulter counter method. The result is shown in Table 4. The 50% D value of the cumulative particle size distribution of this red emitting phosphor was 7.0 $\mu$m. Incidentally, the comparative example 3 in Table 4 shows an existing red emitting phosphor to which only a process for removing a component of a particle diameter of 2 $\mu$m or less that is very low in emission efficiency and a component of a particle diameter of 20 $\mu$m or more that tends to cause coagulation defect is applied.

TABLE 4

| Range of Particle Diameter ($\mu$m) | Ratio (%) | | | |
|---|---|---|---|---|
| | Embodiment 7 | | Comparative Example 3 | |
| 1.587–2.000 | 0.0 | 12.1 | 0.0 | 17.3 |
| 2.000–2.520 | 0.0 | | 0.0 | |
| 2.520–3.175 | 0.9 | | 1.5 | |
| 3.175–4.000 | 2.0 | | 5.0 | |
| 4.000–5.040 | 9.2 | | 10.8 | |
| 5.040–6.350 | 21.3 | 80.6 | 18.3 | 62.8 |
| 6.350–8.000 | 32.3 | | 23.6 | |
| 8.000–10.079 | 27.0 | | 20.9 | |
| 10.079–12.699 | 7.1 | 4.5 | 13.8 | 19.9 |
| 12.699–16.000 | 0.2 | | 5.3 | |
| 16.000–20.159 | 0.0 | | 0.8 | |
| 20.159–25.398 | 0.0 | | 0.0 | |
| 25.398–32.000 | 0.0 | | 0.0 | |
| 32.000–40.317 | 0.0 | | 0.0 | |
| 40.317–50.797 | 0.0 | | 0.0 | |
| over 50.797 | 0.0 | | 0.0 | |
| 50% D Value ($\mu$m) | 7.0 | | 7.1 | |

With each of the aforementioned red emitting phosphors of Embodiment 7 and Comparative Example 3, according to the ordinary method, the respective phosphor slurries are prepared. Following the ordinary method, the respective slurry is coated on a panel of color Braun tube to form each phosphor layer. The state of the respective phosphor layers thus formed was observed by the use of an optical microscope. As a result of this, the phosphor layer that employs the red emitting phosphor of Embodiment 7 was found to be superior in the denseness of the phosphor layer to that of the phosphor layer due to the red emitting phosphor of Comparative Example 3. When measured the light transmittance of the phosphor layers, with the average light transmittance of the phosphor layer due to Comparative Example 3 assigned to 100, that of the phosphor layer due to Embodiment 7 was 90, showing an improvement of the denseness.

Further, when the brightness of the respective phosphor layers were measured, the red brightness of the phosphor layer due to Embodiment 7 was 10% higher than that of the phosphor layer due to Comparative Example 3. In addition, it was confirmed that the white brightness was improved by 5%. Thus, by the use of the larger type red emitting phosphor of the present invention, the brightness of the phosphor layer can be improved. This largely contributes in improvement of the contrast and image quality of the color cathode ray tube.

As obvious from the aforementioned embodiments, according to the red emitting phosphor for cathode ray tube of the present invention, the denseness of the phosphor layer using thereof can be largely improved. Accordingly, the cathode ray tube of the present invention comprising such phosphor layer is excellent in brightness and can realize further higher contrast.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within this scope.

This invention is disclosed in Japanese Patent Application No. 10-240729 filed on Aug. 26, 1998, and the entire disclosure thereof is incorporated herein by reference.

What is claimed is:

1. A red emitting phosphor for cathode ray tubes, comprising:

a phosphor powder of which phosphor base material is yttrium oxysulfide, wherein the phosphor powder has such a particle size distribution that a content of a component of a particle diameter of less than 4.0 $\mu$m is 15% or less, that of a component of a particle diameter of 4.0 $\mu$m or more and less than 8.0 $\mu$m is 75% or more, and that of a component of a particle diameter of 8.0 $\mu$m or more is 10% or less.

2. The red emitting phosphor for a cathode ray tube as set forth in claim 1:

wherein the phosphor powder has a 50% D value of 5.0 $\mu$m or more and 6.5 $\mu$m or less.

3. The red emitting phosphor for a cathode ray tube as set forth in claim 1:

wherein the phosphor powder contains the component of a particle diameter of less than 4.0 $\mu$m in the range of 10% or less.

4. The red emitting phosphor for a cathode ray tube as set forth in claim 1:

wherein the phosphor powder contains the component of a particle diameter of 4.0 $\mu$m or more and less than 8.0 $\mu$m in the range of 82% or more.

5. The red emitting phosphor for a cathode ray tube as set forth in claim 1:

wherein the phosphor powder contains the component of a particle diameter of 8.0 $\mu$m or more in the range of 8% or less.

6. The red emitting phosphor for a cathode ray tube as set forth in claim 1:

wherein the phosphor powder consists essentially of $Y_2O_2S$:Eu phosphor.

7. A red emitting phosphor for a cathode ray tube, comprising:

a phosphor powder of which phosphor base material is yttrium oxysulfide:

wherein the phosphor powder has such a particle size distribution that a content of a component of a particle diameter of less than 5.04 μm is 20% or less, that of a component of a particle diameter of 5.04 μm or more and less than 10.079 μm is 70% or more, and that of a component of a particle diameter of 10.079 μm or more is 10% or less.

8. The red emitting phosphor for a cathode ray tube as set forth in claim 7:

wherein the phosphor powder has a 50% D value of 6.5 μm or more and 8.0 μm or less.

9. The red emitting phosphor for a cathode ray tube as set forth in claim 7:

wherein the phosphor powder contains the component of a particle diameter of less than 5.04 μm in the range of 15% or less.

10. The red emitting phosphor for a cathode ray tube as set forth in claim 7:

wherein the phosphor powder contains the component of a particle diameter of 5.04 μm or more and less than 10.079 μm in the range of 75% or more.

11. The red emitting phosphor for a cathode ray tube as set forth in claim 7:

wherein the phosphor powder contains the component of a particle diameter of 10.079 μm or more in the range of 8% or less.

12. The red emitting phosphor for a cathode ray tube as set forth in claim 7:

wherein the phosphor powder consists essentially of $Y_2O_2S$:Eu phosphor.

13. A cathode ray tube, comprising:

a panel constituting an envelop, the panel having a internal surface;

a phosphor layer formed on the internal surface of the panel and containing the red emitting phosphor as set forth in claim 1; and an electron source that emits an electron beam onto the phosphor layer.

14. The cathode ray tube as set forth in claim 13:

wherein the phosphor layer contains further a blue emitting phosphor and a green emitting phosphor.

15. The cathode ray tube as set forth in claim 13:

wherein the phosphor layer is formed in dot.

16. The cathode ray tube as set forth in claim 13:

wherein the cathode ray tube is used for computer display.

17. A cathode ray tube, comprising:

a panel constituting an envelop, the panel having a internal surface;

a phosphor layer formed on the internal surface of the panel and containing the red emitting phosphor as set forth in claim 7; and an electron source that emits an electron beam onto the phosphor layer.

18. The cathode ray tube as set forth in claim 17:

wherein the phosphor layer contains further a blue emitting phosphor and a green emitting phosphor.

19. The cathode ray tube as set forth in claim 17:

wherein the phosphor layer is formed in stripe.

20. The cathode ray tube as set forth in claim 17:

wherein the cathode ray tube is used for color television.

* * * * *